(12) United States Patent
Srinivasan

(10) Patent No.: US 10,380,625 B2
(45) Date of Patent: Aug. 13, 2019

(54) TECHNOLOGIES FOR ATTRIBUTING ELECTRONIC TRANSACTIONS TO TARGETED ELECTRONIC CONTENT DISTRIBUTION CAMPAIGNS

(71) Applicant: Vantiv, LLC, Cincinnati, OH (US)

(72) Inventor: Thirunarayanan Srinivasan, Highlands Ranch, CO (US)

(73) Assignee: Worldpay, LLC, Symmes Township, OH (US)

( * ) Notice: Subject to any disclaimer, the term of this patent is extended or adjusted under 35 U.S.C. 154(b) by 523 days.

(21) Appl. No.: 14/734,052

(22) Filed: Jun. 9, 2015

(65) Prior Publication Data

US 2016/0364747 A1    Dec. 15, 2016

(51) Int. Cl.
*G06Q 30/02* (2012.01)

(52) U.S. Cl.
CPC ..... *G06Q 30/0246* (2013.01); *G06Q 30/0255* (2013.01)

(58) Field of Classification Search
None
See application file for complete search history.

(56) References Cited

U.S. PATENT DOCUMENTS

| | | | |
|---|---|---|---|
| 9,224,141 B1 * | 12/2015 | Lamba | G06Q 20/341 |
| 2009/0216579 A1 | 8/2009 | Zen et al. | |
| 2011/0125565 A1 * | 5/2011 | MacIlwaine | G06Q 30/02 |
| | | | 705/14.17 |
| 2011/0320262 A1 | 12/2011 | Symons et al. | |
| 2012/0166272 A1 | 6/2012 | Wiley et al. | |
| 2012/0271691 A1 * | 10/2012 | Hammad | G06Q 30/02 |
| | | | 705/14.17 |
| 2013/0124263 A1 | 5/2013 | Amaro et al. | |
| 2014/0372193 A1 * | 12/2014 | Jorgensen | G06Q 30/0226 |
| | | | 705/14.23 |

OTHER PUBLICATIONS

Muhammet Yildiz ;Dr. Mehmet Göktürk , "Combining Biometric ID Cards and Online Credit Card Transactions" IEEE (Year: 2010).*

\* cited by examiner

*Primary Examiner* — Sam Refai
*Assistant Examiner* — Rashida R Shorter
(74) *Attorney, Agent, or Firm* — Bookoff McAndrews, PLLC

(57) ABSTRACT

Technologies for attributing purchases to a targeted marketing campaign include associating a captured payment card number and a captured cardholder identifier with a globally unique identifier. Additional payment card numbers related to the captured payment card number are associated with the globally unique identifier. A cardholder-specific marketing message associated with a targeted marketing campaign is transmitted to the captured cardholder identifier based on the globally unique identifier. The targeted marketing campaign is for an advertised product, which corresponds to a product identifier. A purchase transaction is attributed to the targeted marketing campaign in response to determining that a payment card number associated with the purchase transaction matches any of the payment card numbers associated with the globally unique identifier and determining that a product identifier corresponding to a purchased product of the purchase transaction is associated with the targeted marketing campaign. Other embodiments are described and claimed.

11 Claims, 5 Drawing Sheets

US 10,380,625 B2

TECHNOLOGIES FOR ATTRIBUTING ELECTRONIC TRANSACTIONS TO TARGETED ELECTRONIC CONTENT DISTRIBUTION CAMPAIGNS

TECHNICAL FIELD

Embodiments of the technologies described herein relate, in general, to the field of purchase transactions. More particularly, the technologies described herein relate to the field of attributing purchase transactions to electronic marketing campaigns.

BACKGROUND

Many companies utilize a variety of different marketing campaigns to attract new business, increase revenue, or serve other business needs. For example, it is not uncommon for companies to advertise through multiple marketing channels, such as TV, radio, Internet, and so forth.

SUMMARY

In an embodiment, the present disclosure is directed, in part, to a method for attributing purchases to a targeted marketing campaign, the method includes associating, by a purchase attribution server, a captured payment card number and a captured cardholder identifier with a globally unique identifier and associating, by the purchase attribution server, an additional payment card number with the globally unique identifier, the additional payment card number is related to the captured payment card number. The method further includes transmitting, by the purchase attribution server and to the captured cardholder identifier based on the globally unique identifier, a cardholder-specific marketing message associated with a targeted marketing campaign for an advertised product, wherein the advertised product corresponds to a first product identifier. Additionally, the method further includes attributing, by the purchase attribution server, a purchase transaction to the targeted marketing campaign in response to (i) determining that a payment card number associated with the purchase transaction matches one of the captured payment card number or the additional payment card number associated with the globally unique identifier and (ii) determining that a second product identifier corresponding to a purchased product of the purchase transaction is associated with the targeted marketing campaign.

In another embodiment, the present disclosure is directed, in part, to one or more machine-readable storage media including a plurality of instructions stored thereon that in response to being executed by a purchase attribution server, cause the purchase attribution server to associate a captured payment card number and a captured cardholder identifier with a globally unique identifier and associate an additional payment card number with the globally unique identifier, the additional payment card number is related to the captured payment card number. The plurality of instructions further cause the purchase attribution server to transmit, to the captured cardholder identifier and based on the globally unique identifier, a cardholder-specific marketing message associated with a targeted marketing campaign for an advertised product, wherein the advertised product corresponds to a first product identifier. Additionally, the plurality of instructions further cause the purchase attribution server to attribute a purchase transaction to the targeted marketing campaign in response to (i) a determination that a payment card number associated with the purchase transaction matches one of the captured payment card number or the additional payment card number associated with the globally unique identifier and (ii) a determination that a second product identifier corresponding to a purchased product of the purchase transaction is associated with the targeted marketing campaign.

In another embodiment, the present disclosure is directed, in part, to a purchase attribution system, the purchase attribution system includes a purchase attribution server having a processor executing instructions stored in memory, wherein the instructions cause the processor to associate a captured payment card number and a captured cardholder identifier with a globally unique identifier and associate an additional payment card number with the globally unique identifier, the additional payment card number is related to the captured payment card number. The instructions further cause the processor of the purchase attribution server to transmit, to the captured cardholder identifier and based on the globally unique identifier, a cardholder-specific marketing message associated with a targeted marketing campaign for an advertised product, wherein the advertised product corresponds to a first product identifier. Additionally, the instructions further cause the processor to attribute a purchase transaction to the targeted marketing campaign in response to (i) a determination that a payment card number associated with the purchase transaction matches one of the captured payment card number or the additional payment card number associated with the globally unique identifier and (ii) a determination that a second product identifier corresponding to a purchased product of the purchase transaction is associated with the targeted marketing campaign.

BRIEF DESCRIPTION OF THE DRAWINGS

It is believed that certain embodiments will be better understood from the following description taken in conjunction with the accompanying drawings, in which like references indicate similar elements and in which.

DETAILED DESCRIPTION

Figure 1:
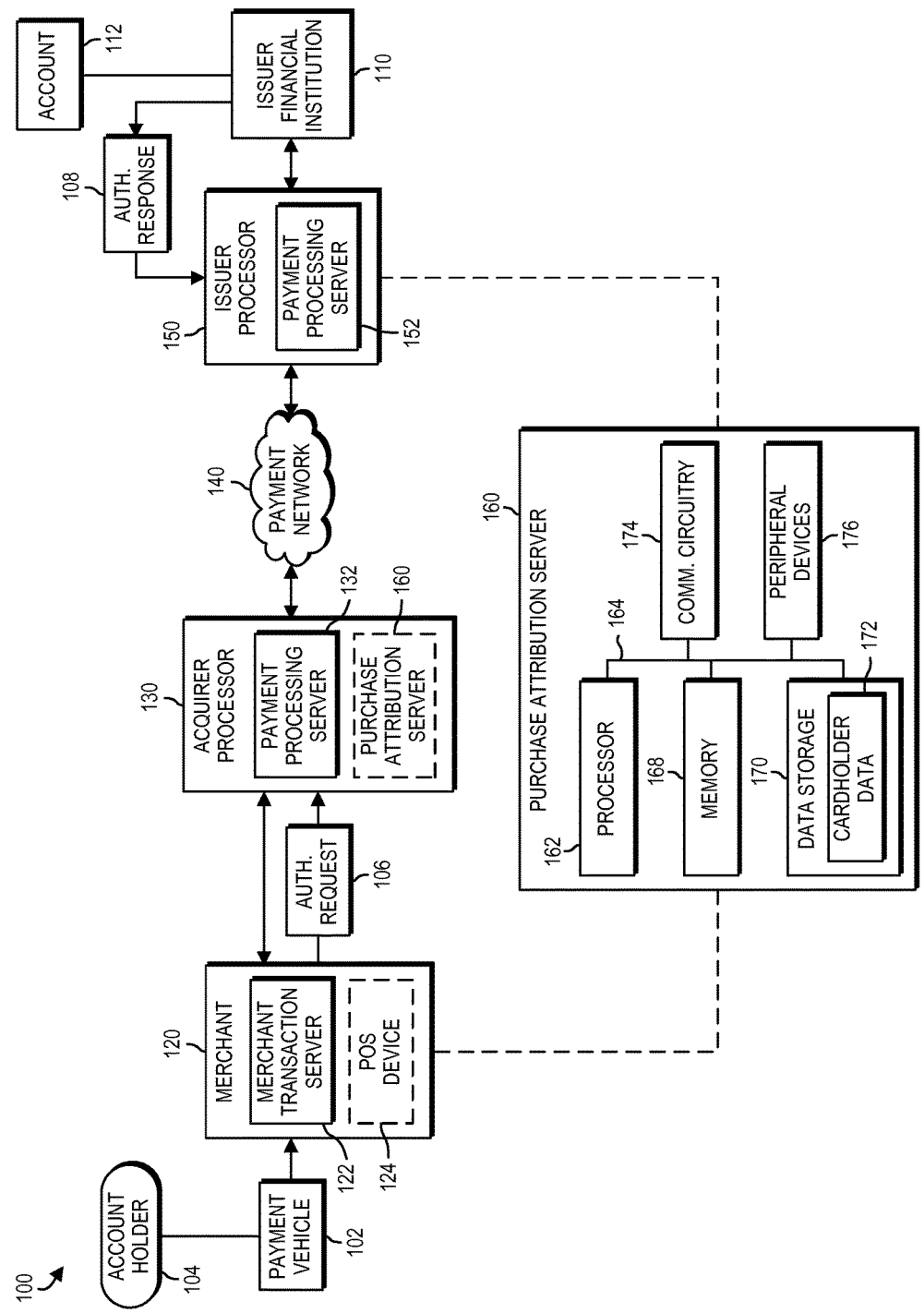
FIG. 1 is a simplified block diagram of at least one embodiment of a system for attributing purchases to a targeted marketing campaign.

Various non-limiting embodiments of the present disclosure will now be described to provide an overall understanding of the principles of the structure, function, and use of systems and methods disclosed herein. One or more examples of these non-limiting embodiments are illustrated in the selected examples disclosed and described in detail with reference made to the figures in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. In addition, elements illustrated in the figures are not necessarily drawn to scale for simplicity and clarity of illustration. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

For simplicity, the description that follows will be provided by reference to a "payment vehicle," which generally refers to any type of financial alternative to currency. As is to be clear to those skilled in the art, no aspect of the present disclosure is specifically limited to a specific type of payment vehicle. Therefore, it is intended that the following description encompasses the use of the present disclosure with many other forms of financial alternatives to currency, including credit cards, debit cards, smart cards, single-use cards, pre-paid cards, electronic currency (such as might be provided through a cellular telephone or personal digital assistant), and the like. Payment vehicles can be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A payment vehicle can also have electronic functionality provided by a network of electronic circuitry that is printed or otherwise incorporated onto or within the payment vehicle (and typically referred to as a "smart card"), or be a fob having a transponder and an RFID reader.

Companies utilize different types of marketing channels in order to increase exposure to a variety of consumers. With specific regard to Internet-based or electronic marketing, it is often difficult for these companies to correlate advertising and marketing expenditures to subsequent purchase events, especially when those purchase events occur through different sales channels or occur subsequent to a consumer's initial exposure to marketing communications. By way of example, a typical consumer may spend time visiting or otherwise interacting with a merchant's website to research a particular good and/or service, referred to herein as "product." The consumer may arrive at the merchant's website in response to "clicking through" an advertisement appearing in an online advertisement received via an electronic message (e.g., an email message, a mobile application message, social media message, etc.). The consumer may decide to the buy the product though the merchant's e-commerce portal during that visit to the merchant's website. Such purchase events are typically traceable by the merchant, or an affiliated entity, such that a correlation between the consumer's online activity and the purchase event can be tracked and identified as a successful "conversion." However, in other instances, instead of purchasing the product in an online transaction, the consumer may decide to physically travel to a brick-and-mortar retail location of the merchant and purchase the product.

Using presently available consumer tracking data, there may be a disconnect between the consumer's online activity and their subsequent purchases at the brick-and-mortar retail location. Nevertheless, it may be desirable for the merchant, or other interested parties, to understand any correlation that exists between the consumer's previous exposure to the merchant's website, or other online activities, and the subsequent purchase of a product at the brick-and-mortar retail location.

In yet other instances, the consumer may decide to leave the merchant's website and then return to the merchant's website at a later point in time to make the purchase. If the consumer arrived at the website the first time by "clicking through" an online advertisement, but arrived at the website the second time through other means (e.g., keyword searching, direct URL input, etc.), the correlation between the two online sessions may not be known to a merchant. More particularly, due to techniques used for tracking online activity by marketers and other data aggregators, when the consumer returns to the website at a later point in time to make a purchase, the online advertisements with which the consumer previously interacted do not typically get credited for driving that purchase event. Accordingly, it is desirable for merchants and/or marketing affiliates to know that a correlation exists between initial interaction with online advertisements and/or other online activities and the subsequent purchase of the product at an e-commerce website during a separate online session.

FIG. 1 depicts a block diagram of an example payment and purchase attribution system 100. In the example payment and purchase attribution system 100, a payment vehicle 102 (e.g., a credit card, a debit card, or any other type of "payment card") can be issued to an account holder 104 by an issuer financial institution 110. The issuer financial institution 110 can be any of a variety of financial institutions capable of issuing a payment vehicle to an account holder 104. In some embodiments, the payment vehicle 102 can be used to pay a merchant 120 for a payment vehicle transaction or at a merchant point of sale (POS) device 124.

The merchant POS device 124 can be any device that facilitates receipt of a payment vehicle 102 for payment of a purchase (e.g., a "purchase transaction"), such as for example, a POS terminal, a smartphone communicatively coupled with a payment dongle, or a web interface. The merchant POS device 124 can send an authorization request 106 for the payment vehicle transaction to an acquirer processor 130 that processes payment vehicle transactions for the merchant 120. The authorization request 106 can include identifying information from the payment vehicle 102, such as a payment card number, a number, an expiration date, and a first and last name of the account holder, for example. The authorization request 106 can also include identifying information from the purchase such as an amount and identifying information from the merchant POS device 124, the merchant transaction server 122, and/or the merchant 120, for example. A payment processing server 132 at the acquirer processor 130 can receive the authorization request 106. The payment processing server 132 can translate the authorization request 106, if necessary, and can provide the authorization request 106 to a payment network 140. The payment network 140 can be, for example, a network of a credit card association affiliated with the payment vehicle 102. Non-limiting examples of credit card associations include VISA, MASTERCARD, DISCOVER, and AMERICAN EXPRESS. The authorization request 106 can then be provided to a payment processing server 152 at an issuer processor 150. In response to receiving the authorization request 106, the payment processing server 152 can provide the authorization request 106 to the issuer financial institution 110. Using information from the authorization request 106, the issuer financial institution 110 can associate the payment vehicle transaction with an account 112 of the account holder 104 held by the issuer financial institution 110. The issuer financial institution 110 can then send an authorization response 108 which can either approve or deny the transaction. The authorization response 108 can be provided to the payment processing server 152 at the issuer processor 150 and then provided to the payment network 140. The authorization response 108 can then be provided to the payment processing server 132 at the acquirer processor 130. Upon receiving the authorization response 108, the payment processing server 132 can send either an approval message or a denial message to the merchant POS device 124 to complete the payment vehicle transaction. If the payment vehicle transaction is approved, it can be posted to the account holder's account 112 and reconciled later with the account holder 104 and the merchant 120.

When a transaction is initiated, the transaction can be stored as a transaction record and can comprise transaction data. Transaction records can be stored in one or more locations within the system 100. In one embodiment, the transaction record can be stored within a transaction database (not shown) communicably coupled to the payment processing server 132. The transaction data can be received by the transaction database from various sources, such as the merchant POS device 124, the merchant transaction server 122, the merchant 120, the acquirer processor 130, and so on. A plurality of transaction parameters associated with the payment vehicle transaction can be stored in each transaction record which can generally be used for settlement and financial recordkeeping. While the transaction parameters stored in each transaction record can vary, example transaction parameters can include, without limitation, account number, card number, payment vehicle information, product information (such as product identifier, product type, product serial number, and so forth), transaction amount, loyalty account information, merchant information, transaction amount, transaction date, transaction time, whether the transaction was a "card present" transaction, and so on.

In embodiments such as the one illustratively shown in FIG. 1, the payment and purchase attribution system 100 can include a purchase attribution server 160 configured to attribute a purchase transaction to a targeted marketing campaign. To do so, the purchase attribution server 160 can receive transaction data (e.g., payment card numbers, transaction amount data, etc.) and cardholder-specific data (e.g., cardholder identifiers such as electronic mail addresses, mailing addresses, marketing preferences, etc.) from the merchant POS device 124 or any other device or system of the payment and purchase attribution system 100. It should be appreciated that in some embodiments, such data can be captured by merchant POS device 124 or any other device or system of the payment and purchase attribution system 100 during an initial transaction conducted by a cardholder (e.g., a consumer, user, etc.). The purchase attribution server 160 can also be configured to request and receive additional payment card numbers related to a payment card number used during a purchase transaction. In some embodiments, the purchase attribution server 160 can associate a payment card number used during a purchase transaction, any related payment card numbers, and an electronic mail address or other cardholder identifier corresponding to a cardholder with a globally unique identifier, which can be generated by the purchase attribution server 160 or any other device or system of the payment and purchase attribution system 100.

Additionally, the purchase attribution server 160 is configured to generate and transmit one or more cardholder-specific marketing messages associated with a targeted marketing campaign. The targeted marketing campaign can include one or more products being advertised. A product identifier can be associated with each product being advertised via the targeted marketing campaign. In some embodiments, the cardholder-specific marketing messages generated by the purchase attribution server 160 include a customized hyperlink for each advertised product of the targeted marketing campaign. In such embodiments, each customized hyperlink can be generated based on the globally unique identifier and the product identifier corresponding to the particular product being advertised.

The purchase attribution server 160 is also configured to capture interaction data indicative of a cardholder's interaction with a cardholder-specific marketing message or one of the customized hyperlinks included therein. For example, in some embodiments, the purchase attribution server 160 is configured to capture data indicative of a cardholder's selection of a customized hyperlink included in a cardholder-specific marketing email message sent to the cardholder's email address. It should be appreciated that the purchase attribution server 160 may be configured to capture any other type of data indicative of a cardholder's interaction with the cardholder-specific marketing message or the customized hyperlink(s) included therein.

In the illustrative embodiment, the purchase attribution server 160 also attributes a purchase transaction to a targeted marketing campaign. To do so, the purchase attribution server 160 is configured to determine whether a payment card number used during a purchase transaction matches a previously captured payment card number or a different payment card number related to the previously captured payment card number. In such embodiments, the purchase attribution server 160 is also configured to determine that a product identifier corresponding to a product purchased during the purchase transaction is associated with the targeted marketing campaign. To do so, the purchase attribution server 160 can compare the product identifier corresponding to the product purchased during the purchase transaction to one or more of the product identifiers corresponding to the products advertised via the targeted marketing campaign. In embodiments in which the purchase attribution server 160 determines that the payment card used for the purchase transaction matches and one or more of the product identifiers of the purchased products correspond to a product identifier of one or more of the advertised products, the purchase attribution server 160 can attribute that purchase transaction to the targeted marketing campaign.

The purchase attribution server 160 can be embodied as any type of server or computing device capable of processing, communicating, storing, maintaining, and transferring data. For example, the purchase attribution server 160 can be embodied as a server, a microcomputer, a minicomputer, a mainframe, a desktop computer, a laptop computer, a mobile computing device, a handheld computer, a smart phone, a tablet computer, a personal digital assistant, a telephony device, a custom chip, an embedded processing device, or other computing device and/or suitable programmable device. In some embodiments, the purchase attribution server 160 can be embodied as a computing device integrated with other systems or subsystems. In the illustrative embodiment of FIG. 1, the purchase attribution server 160 includes a processor 162, a system bus 164, a memory 168, a data storage 170, communication circuitry 174, and one or more peripheral devices 176. Of course, the purchase attribution server 160 can include other or additional components, such as those commonly found in a server and/or computer (e.g., various input/output devices), in other embodiments. Additionally, in some embodiments, one or more of the illustrative components can be incorporated in, or otherwise from a portion of, another component. For example, the memory 168, or portions thereof, can be incorporated in the processor 162 in some embodiments. Furthermore, it should be appreciated that the purchase attribution server 160 can include other components, sub-components, and devices commonly found in a computer and/or computing device, which are not illustrated in FIG. 1 for clarity of the description. Additionally, although the purchase attribution server 160 is illustratively shown as being a separate, stand-alone computing device, it may also be managed and operated by the acquirer processor 130 and/or any other entity of the payment and purchase attribution system 100.

The processor 162 can be embodied as any type of processor capable of performing the functions described herein. For example, the processor 162 can be embodied as a single or multi-core processor, a digital signal processor, microcontroller, a general purpose central processing unit (CPU), a reduced instruction set computer (RISC) processor, a processor having a pipeline, a complex instruction set computer (CISC) processor, an application specific integrated circuit (ASIC), a programmable logic device (PLD), a field programmable gate array (FPGA), or other processor or processing/controlling circuit or controller.

In various configurations, the purchase attribution server 160 includes a system bus 164 for interconnecting the various components of the purchase attribution server 160. The system bus 164 can be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations with the processor 162, the memory 168, and other components of the purchase attribution server 160. In some embodiments, the purchase attribution server 160 can be integrated into one or more chips such as a programmable logic device or an application specific integrated circuit (ASIC). In such embodiments, the system bus 164 can form a portion of a system-on-a-chip (SoC) and be incorporated, along with the processor 162, the memory 168, and other components of the purchase attribution server 160, on a single integrated circuit chip.

The memory 168 can be embodied as any type of volatile or non-volatile memory or data storage capable of performing the functions described herein. For example, the memory 168 can be embodied as read only memory (ROM), random access memory (RAM), cache memory associated with the processor 162, or other memories such as dynamic RAM (DRAM), static ram (SRAM), programmable ROM (PROM), electrically erasable PROM (EEPROM), flash memory, a removable memory card or disk, a solid state drive, and so forth. In operation, the memory 168 can store various data and software used during operation of the purchase attribution server 160 such as operating systems, applications, programs, libraries, and drivers.

The data storage 170 can be embodied as any type of device or devices configured for short-term or long-term storage of data such as, for example, memory devices and circuits, memory cards, hard disk drives, solid-state drives, or other data storage devices. For example, in some embodiments, the data storage 170 includes storage media such as a storage device that can be configured to have multiple modules, such as magnetic disk drives, floppy drives, tape drives, hard drives, optical drives and media, magneto-optical drives and media, compact disc drives, Compact Disc Read Only Memory (CD-ROM), Compact Disc Recordable (CD-R), Compact Disc Rewriteable (CD-RW), a suitable type of Digital Versatile Disc (DVD) or Blu-Ray disc, and so forth. Storage media such as flash drives, solid state hard drives, redundant array of individual disks (RAID), virtual drives, networked drives and other memory means including storage media on the processor 162, or the memory 168 are also contemplated as storage devices. It should be appreciated that such memory can be internal or external with respect to operation of the disclosed embodiments. It should also be appreciated that certain portions of the processes described herein can be performed using instructions stored on a computer-readable medium or media that direct or otherwise instruct a computer system to perform the process steps. Non-transitory computer-readable media, as used herein, comprises all computer-readable media except for transitory, propagating signals.

In some embodiments, the data storage 170 includes cardholder data 172. The cardholder data 172 can include transaction data (e.g., payment card numbers, transaction amount data, etc.) and cardholder-specific data (e.g., cardholder identifiers such as electronic mail addresses, mailing addresses, marketing preferences, etc.), which can be captured and received from the merchant POS device 124 or any other device or system of the payment and purchase attribution system 100. In some embodiments, the cardholder data 172 can be captured by the merchant POS device 124 during an initial transaction or previous transaction by a cardholder. For example, in some embodiments, the merchant POS device 124 can capture a cardholder's payment card number and email address during a purchase transaction occurring at a brick-and-mortar location of the merchant 120. Additionally or alternatively, the merchant POS device 124, or another computing device associated with the merchant 120, can capture a cardholder's payment card number and email address during online establishment of a profile or loyalty account for the cardholder. The cardholder data 172 corresponding to a cardholder can also include one or more additional payment card numbers associated with, or related to, the cardholder and/or a payment card number previously used by the cardholder during an earlier purchase transaction. It should be appreciated that some or all of the cardholder data 172 can be encrypted, tokenized, or otherwise secured. Further, it should be appreciated that the cardholder data 172 can also include any other type of data associated with a cardholder and/or a payment card of the cardholder.

The communication circuitry 174 of the purchase attribution server 160 may be embodied as any type of communication circuit, device, interface, or collection thereof, capable of enabling communications between the purchase attribution server 160 and the merchant transaction server 122, merchant POS device 124, payment processing server 132 of the acquirer processor 130, payment processing server 152 of the issuer processor 150, other computing devices of the payment and purchase attribution system 100, and/or any other computing device communicatively coupled thereto. For example, the communication circuitry 174 may be embodied as one or more network interface controllers (NICs), in some embodiments. The communication circuitry 174 may be configured to use any one or more communication technologies (e.g., wireless or wired communications) and associated protocols (e.g., Ethernet, Wi-Fi®, WiMAX, etc.) to effect such communication.

In some embodiments, the purchase attribution server 160, merchant transaction server 122, merchant POS device 124, payment processing server 132 of the acquirer processor 130, payment processing server 152 of the issuer processor 150, other computing devices of the payment and purchase attribution system 100, and/or any other computing device communicatively coupled thereto, can communicate with each other over one or more networks. The network(s) can be embodied as any number of various wired and/or wireless communication networks. For example, the network(s) can be embodied as or otherwise include a local area network (LAN), a wide area network (WAN), a cellular network, or a publicly-accessible, global network such as the Internet. Additionally, the network(s) can include any number of additional devices to facilitate communication between the computing devices of the payment and purchase attribution system 100.

Additionally, in some embodiments, the purchase attribution server 160 can further include one or more peripheral devices 176. Such peripheral devices 176 can include any type of peripheral device commonly found in a computing device such as additional data storage, speakers, a hardware keyboard, a keypad, a gesture or graphical input device, a motion input device, a touchscreen interface, one or more displays, an audio unit, a voice recognition unit, a vibratory device, a computer mouse, a peripheral communication device, and any other suitable user interface, input/output device, and/or other peripheral device.

In some embodiments, the purchase attribution server 160 establishes an environment during operation. The environment can include various modules, components, sub-components, and devices commonly found in computing devices, which are not illustrated in the figures for clarity of the description. The various modules, components, sub-components, and devices of the environment can be embodied as hardware, firmware, software, or a combination thereof. For example, one or more of the modules, components, sub-components, and devices of the environment can be embodied as a processor and/or a controller configured to provide the functionality described herein.

Figure 2:
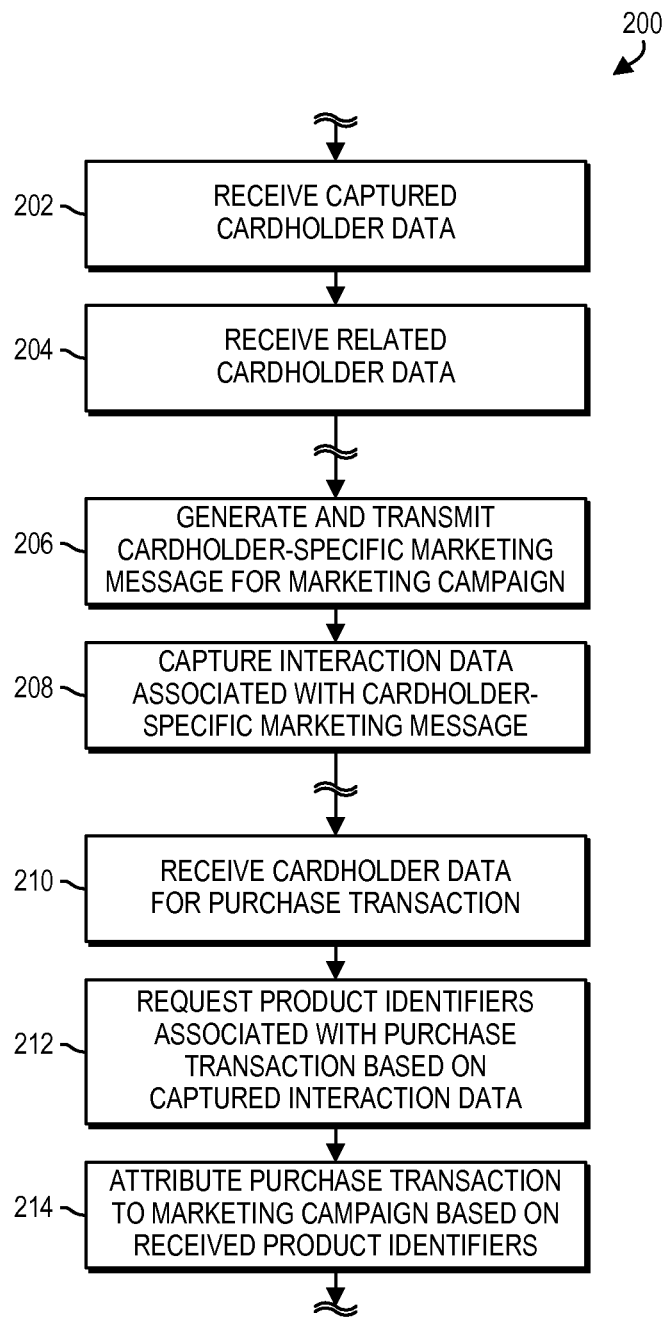
FIG. 2 is a simplified flow diagram of at least one embodiment of a method that may be executed by the purchase attribution server of FIG. 1 for attributing purchases to a targeted marketing campaign.

Referring now to FIG. 2, a method 200 that may be executed by the purchase attribution server 160 for attributing a purchase transaction to a targeted marketing campaign begins with block 202. In block 202, the purchase attribution server 160 receives captured cardholder data. The captured cardholder data includes a payment card number, which can be captured by and received from the merchant POS device 124, in some embodiments. In some embodiments, the captured cardholder data (e.g., the payment card number) can be captured by the merchant POS device 124 during an initial or previous purchase transaction or interaction with the consumer or user. For example, the captured cardholder data received by the purchase attribution server 160 can be captured by the merchant POS device 124 during an initial or previous electronic or physical (e.g., brick-and-mortar) purchase transaction, creation of a user account for the merchant's 120 website, creation of a loyalty account, or at any other time. Additionally, the captured cardholder data can include a cardholder identifier (e.g., an email address, a user name, a social media account, etc.) or any other type of data that identifies a cardholder and/or a location at which an electronic marketing message can be sent. It should be appreciated that, in other embodiments, the captured cardholder data can also include any other type of data corresponding to a cardholder or a purchase transaction and can be captured by any other computing device of the payment and purchase transaction system 100.

In block 204, the purchase attribution server 160 receives one or more additional payment card numbers related to (e.g., linked to, associated with, etc.) the captured payment card number. In some embodiments, the purchase attribution server 160 requests the additional payment card numbers related to the captured payment card number from the issuer financial institution 110 and/or the issuer processor 150 for the issuer financial institution 110. To do so, the purchase attribution server 160 can generate a message including the captured payment card number and requesting the issuer financial institution 110 and/or the issuer processor 150 for the issuer financial institution 110 to send back any additional payment card numbers related to the captured payment card number.

In block 206, the purchase attribution server 160 generates a cardholder-specific marketing message based on product identifier(s) associated with one or more products advertised via a targeted marketing campaign. The cardholder-specific marketing message includes a customized hyperlink for each product being advertised via the targeted marketing campaign. After generation, the cardholder-specific marketing message can be transmitted to a particular consumer or user (e.g., a cardholder). To do so, the purchase attribution server 160 can transmit the generated cardholder-specific marketing message to the cardholder identifier associated with the consumer or user to which the cardholder-specific marketing message is to be sent.

In block 208, the purchase attribution server 160 captures (e.g., logs, stores, etc.) interaction data indicative of the consumer or user's interaction with one of the customized hyperlinks of the cardholder-specific marketing message. For example, in some embodiments, the purchase attribution server 160 captures whether the consumer "clicked" or otherwise selected one of the customized hyperlinks of the cardholder-specific marketing message.

In block 210, the purchase attribution server 160 receives cardholder data associated with a purchase transaction. For example, in some embodiments, the purchase attribution server 160 can receive a payment card number used to purchase a product or service from the merchant 120 during a purchase transaction. In some embodiments, the cardholder data (e.g., the payment card number) associated with the purchase transaction can be received from the payment processing server 132 or another device of the acquirer processor 130 in response to receipt of the authorization request 106 from the merchant 120. Additionally or alternatively, the cardholder data (e.g., the payment card number) associated with the purchase transaction can be received directly (e.g., out-of-band) from a device of the merchant 120 (e.g., the merchant transaction server 122, the merchant point-of-sale device 124, etc.). It should be appreciated that the cardholder data associated with the purchase transaction can also be received from any other computing device of the payment and purchase attribution system 100 at any other point in time.

In block 212, the purchase attribution server 160 requests one or more product identifiers corresponding to one or more products purchased during the purchase transaction. In some embodiments, the purchase attribution server 160 requests the product identifier(s) corresponding to the product(s) purchased during the purchase transaction based at least in part on, or otherwise as a function of, determining that a consumer or user previously interacted with one or more customized hyperlinks of a cardholder-specific marketing message sent in connection with the targeted marketing campaign. The request can be transmitted directly (e.g., out-of-band) to a device of the merchant 120 (e.g., the merchant transaction server 122, the merchant point-of-sale device 124, a centralized merchant transaction server, etc.). For example, in some embodiments, the request can be transmitted to a merchant transaction server 122 configured to maintain transaction data for a particular location of the merchant 120 (e.g., an individual brick-and-mortar location, an e-commerce site, etc.). Additionally or alternatively, the request can be transmitted to a centralized merchant transaction server configured to maintain transaction data for multiple locations of the merchant 120 (e.g., a group of brick-and-mortar locations). In block 214, the purchase attribution server 160 attributes the purchase transaction to the targeted marketing campaign based at least in part on, or otherwise as a function of, determining that one or more received product identifiers associated with the product(s) purchased during the purchase transaction correspond to one or more product identifiers associated with products advertised via the targeted marketing campaign.

Figure 3:
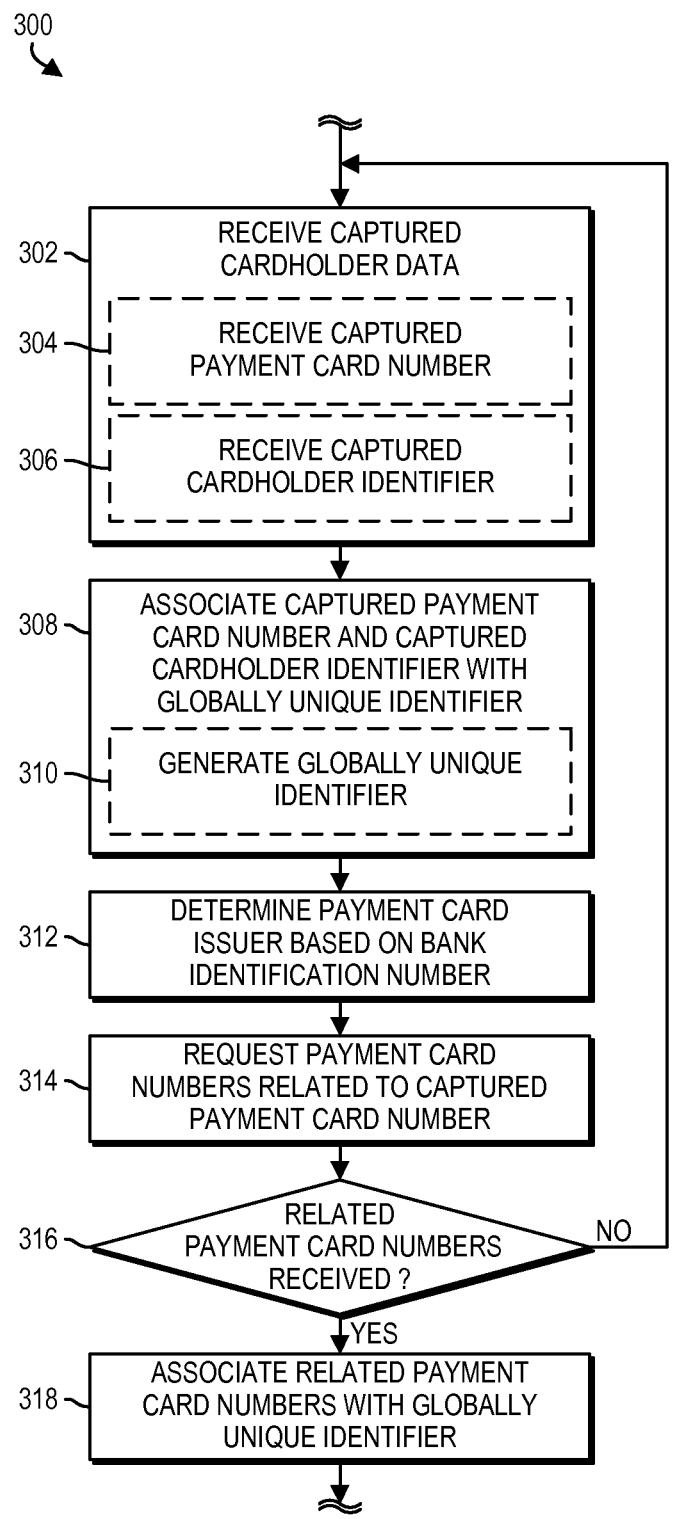
FIG. 3 is a simplified flow diagram of at least one embodiment of a method that may be executed by the purchase attribution server of FIG. 1 for associating captured cardholder data and related payment card numbers with a globally unique identifier.

Referring now to FIG. 3, a method 300 that may be executed by the purchase attribution server 160 for associating captured cardholder data and related payment card numbers with a globally unique identifier begins with block 302. In block 302, the purchase attribution server 160 receives captured cardholder data. The captured cardholder data can be captured and received from the merchant POS device 124, in some embodiments. For example, in block 304, the purchase attribution server 160 can receive a payment card number captured by the merchant POS device 124 during an initial or previous purchase transaction or interaction with the cardholder (e.g., consumer, user, etc.). Additionally, in block 306, the purchase attribution server 160 can receive a cardholder identifier from the merchant POS device 124. The cardholder identifier can be embodied as an electronic message address corresponding to the cardholder and, in some embodiments, can also be captured by the merchant POS device 124 during an initial or previous purchase transaction or interaction. It should be appreciated that the cardholder identifier may be any other type of data or information that identifies a cardholder and/or a location at which a cardholder-specific marketing message may be sent. Additionally, in some embodiments, the captured payment card number and/or the cardholder identifier may be captured by any other computing device of the payment and purchase attribution system 100 at any other time (e.g., via online user account or loyalty account creation, etc.).

In block 308, the purchase attribution server 160 associates the captured payment card number and the captured cardholder identifier with a globally unique identifier. In some embodiments, in block 310, the globally unique identifier can be generated by the purchase attribution server 160. The globally unique identifier can also be generated by any other computing device of the payment and purchase attribution system 100, in other embodiments. In some embodiments, the globally unique identifier can be used to link and/or associate one or more other types of data such as, for example, one or more captured payment card number(s), related payment card number(s), and cardholder identifier(s). Additionally, in some embodiments, the globally unique identifier can be merchant-specific. For example, in such embodiments, a different globally unique identifier for the same cardholder may be generated for each merchant sponsoring a targeted marketing campaign.

In block 312, the purchase attribution server 160 determines the issuer financial institution 110 of the captured payment card number. To do so, the purchase attribution server 160 can determine a bank identification number (BIN) based on the captured payment card number. For example, in some embodiments, the purchase attribution server 160 can analyze or otherwise parse the captured payment card number to extract the BIN. After obtaining the BIN, the purchase attribution server 160 can determine the issuer financial institution 110 of the captured payment card number based at least in part on, or otherwise as a function of, the BIN.

In block 314, the purchase attribution server 160 requests additional payment card numbers related (e.g., linked, associated, etc.) to the captured payment card number. In some embodiments, the purchase attribution server 160 requests the additional payment card numbers related to the captured payment card number from the issuer financial institution 110 and/or the issuer processor 150 for the issuer financial institution 110. To do so, in some embodiments, the purchase attribution server 160 can generate a message that includes the captured payment card number. The generated message can request any additional payment card numbers related to the captured payment card number. In some embodiments, the issuer financial institution 110 and/or the issuer processor 150 for the issuer financial institution 110 can provide (e.g., transmit, send, etc.) any related payment card numbers in response, which can be received by the purchase attribution server 160.

In decision block 316, the purchase attribution server 160 determines whether any related card numbers are received. As discussed, the related payment card numbers can be received in response to a request by the purchase attribution server 160 for additional payment card numbers related or otherwise linked to the captured payment card number. If, in decision block 316, the purchase attribution server 160 determines that no additional payment related to the captured payment card number are received, the method 300 loops back to block 302 and the purchase attribution server 160 receives additional cardholder data. If, however, the purchase attribution server 160 determines instead that one or more additional payment card numbers related to the captured payment card number are received, the method 300 advances to block 318. In block 318, the purchase attribution server 160 associates the additional payment card number(s) related to the captured payment card number with the globally unique identifier.

Figure 4:
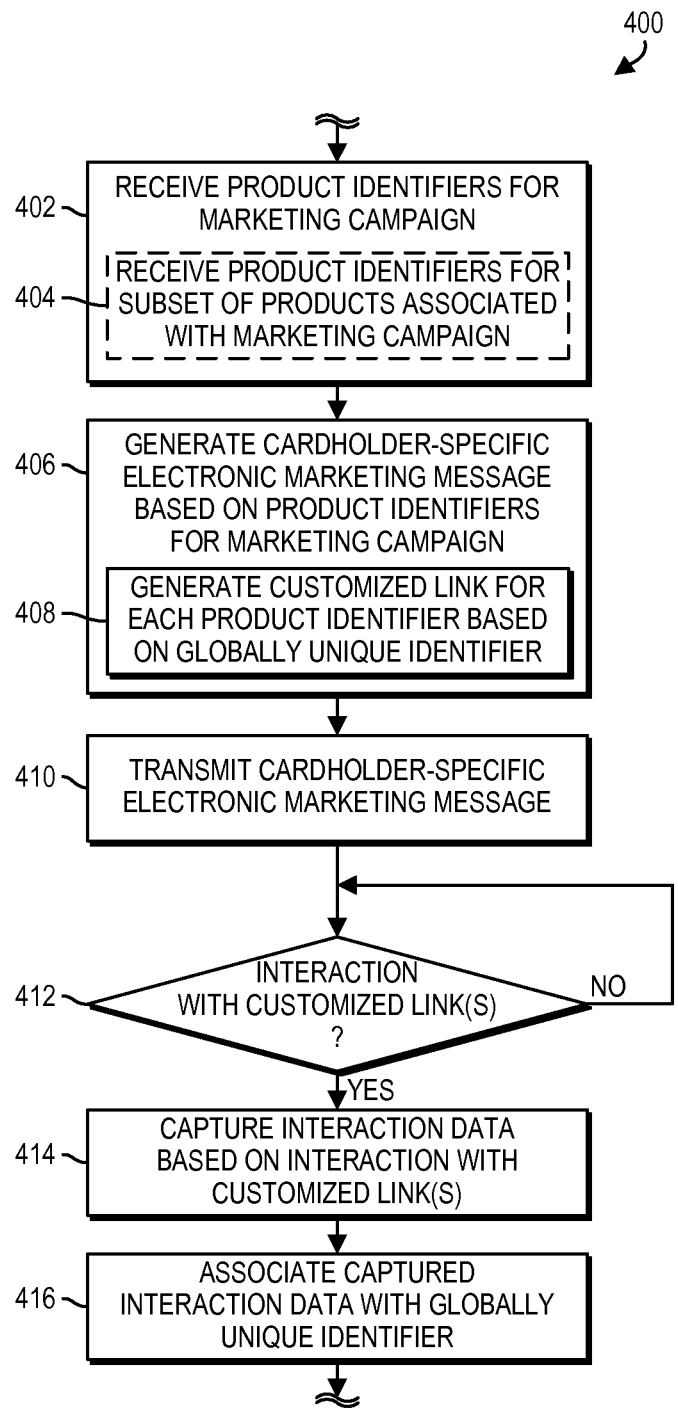
FIG. 4 is a simplified flow diagram of at least one embodiment of a method that may be executed by the purchase attribution server of FIG. 1 for generating cardholder-specific marketing messages and capturing cardholder interaction data.

Referring now to FIG. 4, a method 400 that may be executed by the purchase attribution server 160 for generating cardholder-specific marketing messages and capturing cardholder interaction data begins with block 402. In block 402, the purchase attribution server 160 receives product identifiers for a targeted marketing campaign. The targeted marketing campaign can include one or more products that are to be advertised. Each product advertised via the targeted marketing campaign can be associated with a unique product identifier. In some embodiments, the purchase attribution server 160 can receive product identifiers for some or all of the products sold or offered by the merchant 120. As such, in some embodiments, in block 404, the purchase attribution server 160 can receive one or more product identifiers for a subset (e.g., a portion, part, etc.) of the products sold or offered by the merchant 120. In such embodiments, the product identifier(s) for the subset of the products sold or offered by the merchant 120 can be associated with, or correspond to, the advertised product(s) associated with the targeted marketing campaign.

In block 406, the purchase attribution server 160 generates a cardholder-specific marketing message based on the product identifiers associated with the products advertised via the targeted marketing campaign. In some embodiments, the cardholder-specific marketing message includes a customized hyperlink for each product being advertised via the marketing campaign. The customized hyperlink for a particular product can be embodied as or include a uniform resource locator (URL) that refers to a product website or landing page of the merchant 120. The product website can be configured to provide consumers or users (e.g., cardholders) with information regarding the advertised product. In some embodiments, the product website can also provide consumers or users with the ability to purchase the advertised product from the merchant 120. Additionally, to facilitate attributing a purchase transaction to the targeted marketing campaign, the customized hyperlinks can also include a globally unique identifier associated with a particular consumer or user. For example, in block 408, the purchase attribution server 160 can generate a customized hyperlink for each product being advertised that includes the URL of the corresponding product website and a globally unique identifier associated with a particular consumer or user incorporated therein or appended thereto.

In block 410, the purchase attribution server 160 transmits the cardholder-specific marketing message to a particular user or consumer. To do so, in embodiments in which the cardholder-specific marketing message is embodied as an email message, the purchase attribution server 160 can transmit the cardholder-specific marketing message to the email address associated with a particular consumer or user. As discussed above, in some embodiments, the captured payment card number, captured cardholder identifier, and related payment card numbers, can be associated with the globally unique identifier. In such embodiments, the purchase attribution server 160 can transmit the cardholder-specific marketing message to the captured cardholder identifier associated with the same globally unique identifier that was incorporated within or appended to the URL of the customized hyperlinks.

In decision block 412, the purchase attribution server 160 determines whether the consumer or user to which the cardholder-specific marketing message was sent interacts with the customized hyperlink(s) of the cardholder-specific marketing message. For example, in some embodiments, the purchase attribution server 160 can determine whether the consumer or user "clicked" or otherwise selected one of the customized hyperlinks of the cardholder-specific marketing message. To do so, the purchase attribution server 160 can monitor the corresponding product website and/or server redirect data. It should be appreciated that the purchase attribution server 160 can use any other mechanism for determining whether the consumer or user "clicked" or otherwise selected one of the customized hyperlinks of the cardholder-specific marketing message. If, in decision block 412, the purchase attribution server 160 determines that the consumer or user has not "clicked" or otherwise selected one of the customized hyperlinks of the cardholder-specific marketing message, the method 400 loops back to decision block 412 and the purchase attribution server 160 continues monitoring whether the consumer or user "clicks" or interacts with one of the customized hyperlinks. If, however, the purchase attribution server 160 determines instead that the consumer or user "clicks" or interacts with one of the customized hyperlinks of the cardholder-specific marketing message, the method 400 advances to block 414.

In block 414, the purchase attribution server 160 captures (e.g., logs, stores, etc.) the interaction data based on the consumer or user's interaction with one of the customized hyperlinks of the cardholder-specific marketing message. Subsequently, in block 416, the purchase attribution server 160 associates the captured interaction data with the globally unique identifier corresponding to the consumer or user.

Figure 5:
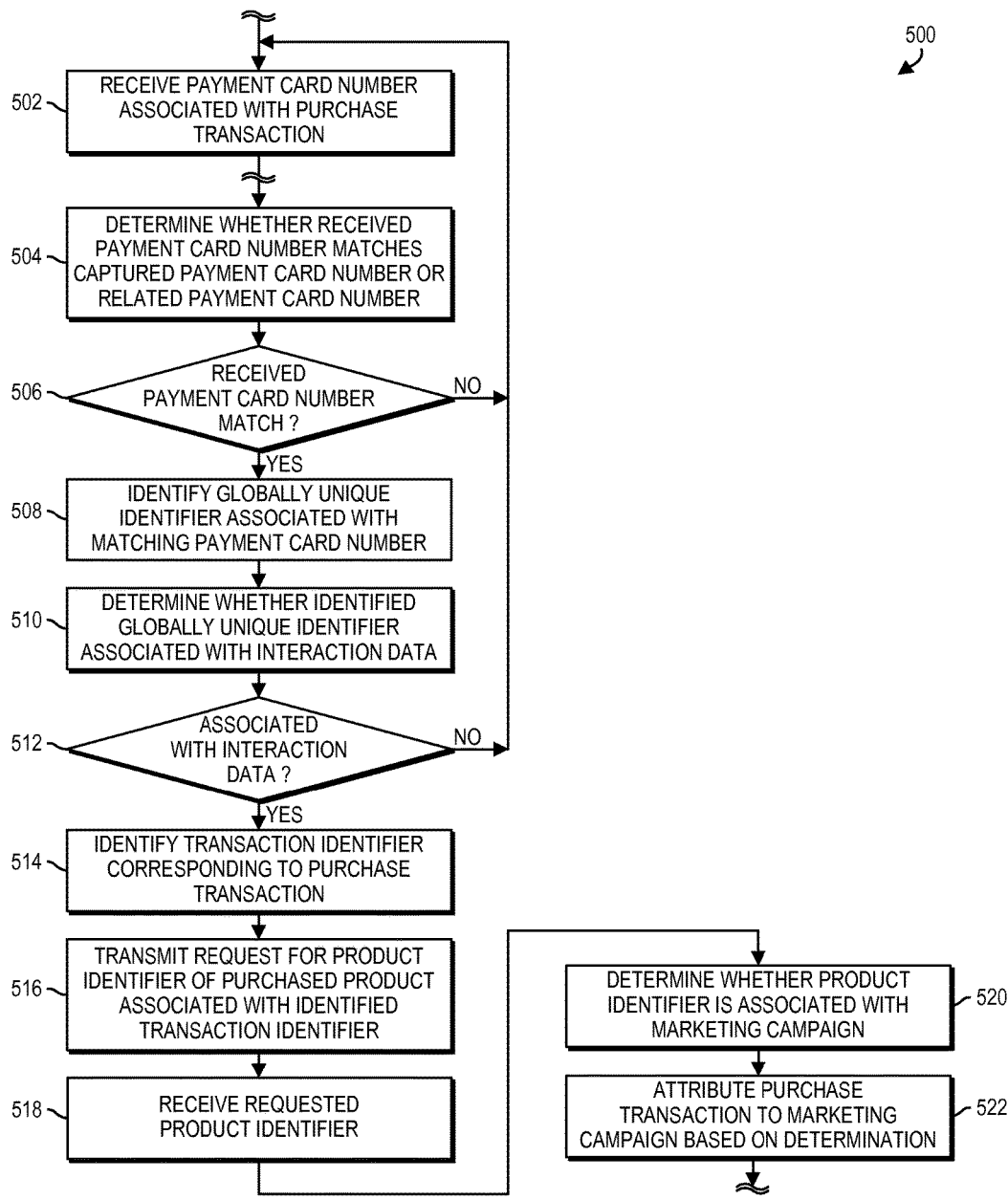
FIG. 5 is a simplified flow diagram of at least one embodiment of a method that may be executed by the purchase attribution server of FIG. 1 for attributing a purchase transaction to a targeted marketing campaign.

Referring now to FIG. 5, a method 500 that may be executed by the purchase attribution server 160 for attributing a purchase transaction to a targeted marketing campaign begins with block 502. In block 502, the purchase attribution server 160 receives a payment card number associated with a purchase transaction. For example, the purchase attribution server 160 can receive a payment card number used to purchase a product or service from the merchant 120 during a purchase transaction. In some embodiments, the payment card number associated with the purchase transaction can be received from the payment processing server 132 or another device of the acquirer processor 130 in response to receipt of the authorization request 106 from the merchant 120. Additionally or alternatively, the payment card number associated with the purchase transaction can be received directly (e.g., out-of-band) from a device of the merchant 120 (e.g., the merchant transaction server 122, the merchant point-of-sale device 124, etc.). It should be appreciated that the payment card number associated with the purchase transaction can also be received from any other computing device of the payment and purchase attribution system 100 at any other point in time.

In block 504, the purchase attribution server 160 determines whether the received payment card number matches a previously-captured payment card number or a different payment card number related to the previously-captured payment card number. As discussed above with reference to the method 300 of FIG. 3, in some embodiments, the captured payment card and the related payment card number(s) can be received by the purchase attribution server 160 in response to an initial or previous purchase transaction or interaction by a consumer or user (e.g., cardholder). Referring back to FIG. 5, the method 500 advances to decision block 506. In decision block 506, if the purchase attribution server 160 determines in block 504 that the received payment card number matches a previously-captured payment card number or a different payment card number related to the previously-captured payment card number, the method 500 advances to block 508. If, however, the purchase attribution server 160 instead determines in block 504 that the received payment card number does not match the previously-captured payment card number or the related payment card number(s), the method 500 loops back to block 502 and the purchase attribution server 160 receives another payment card number associated with a different purchase transaction.

In block 508, the purchase attribution server 160 identifies the globally unique identifier associated with the previously-captured payment card number or the additional payment card number related to the previously-captured payment card number that matches the received payment card number. As discussed above, in some embodiments, the previously-captured payment card number and the related payment card number(s) can be associated with a globally unique identifier.

Additionally, as discussed above with reference to the method 400 of FIG. 4, the captured interaction data can also be associated with the globally unique identifier. The interaction data can be captured by the purchase attribution server 160 in response to a consumer or user's (e.g., cardholder's) interaction with a customized hyperlink included within a cardholder-specific marketing message. Referring back to FIG. 5, in block 510, the purchase attribution server 160 determines whether the identified globally unique identifier is associated with previously-captured interaction data and the method 500 advances to decision block 512. In decision block 512, if the purchase attribution server 160 determines in block 510 that previously-captured interaction data is associated with the identified globally unique identifier, the method 500 advances to block 514. If, however, the purchase attribution server 160 instead determines in block 510 that no previously-captured interaction data is associated with the identified globally unique identifier, the method 500 loops back to block 502 and the purchase attribution server 160 receives another payment card number associated with a different purchase transaction.

In block 514, the purchase attribution server 160 identifies a transaction identifier corresponding to the purchase transaction. The transaction identifier uniquely identifies the purchase transaction and can be generated by, and received from, a device of the acquirer processor 130 (e.g., the payment processing server 132, the purchase attribution server 160, etc.) or a device of the merchant 120 (e.g., the merchant transaction server 122, the merchant point-of-sale device 122, etc.). It should be appreciated that the transaction identifier can also be generated by, and received from, any other computing device of the payment and purchase attribution system 100.

In block 516, the purchase attribution server 160 transmits a request for a product identifier (or product identifiers) corresponding to the product(s) purchased during the purchase transaction. The request for the product identifier(s) can include the identified transaction identifier for the purchase transaction. In some embodiments, the purchase attribution server 160 transmits the request for the product identifier(s) to the merchant 120 (e.g., to the merchant transaction server 122, the merchant POS device 124, or any other device of the merchant 120). In block 518, the purchase attribution server 160 receives the requested product identifier(s) from the device(s) of the merchant 120.

In block 520, the purchase attribution server 160 determines whether the received product identifier(s) are associated with the targeted marketing campaign. That is, the purchase attribution server 160 determines whether the received product identifier(s) correspond to products that are being advertised via the targeted marketing campaign. In block 522, in response to determining that the received product identifier(s) are associated with the targeted marketing campaign, the purchase attribution server 160 attributes all or part of the purchase transaction to the targeted marketing campaign.

In various embodiments disclosed herein, a single component can be replaced by multiple components and multiple components can be replaced by a single component to perform a given function or functions. Except where such substitution would not be operative, such substitution is within the intended scope of the embodiments.

Some of the figures can include a flow diagram. Although such figures can include a particular logic flow, it can be appreciated that the logic flow merely provides an exemplary implementation of the general functionality. Further, the logic flow does not necessarily have to be executed in the order presented unless otherwise indicated. In addition, the logic flow can be implemented by a hardware element, a software element executed by a computer, a firmware element embedded in hardware, or any combination thereof.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

The invention claimed is:

1. A method for attributing electronic transactions to a targeted electronic content distribution campaign, the method comprising:
generating, by an electronic transaction attribution server, a globally unique identifier, wherein the globally unique identifier links a captured payment card number to a captured cardholder identifier and an additional payment card number, wherein the captured payment card number is captured at a first point of sale device at a first time, and wherein the additional payment card number is requested and received from a payment card issuer associated with the captured payment card number;
generating, by the electronic transaction attribution server, an electronic content distribution message associated with an electronic content distribution campaign for a product, wherein the product is associated with a first product identifier, and wherein the electronic content distribution message is targeted for a cardholder associated with the captured cardholder identifier and comprises a customized hyperlink including the globally unique identifier appended to a uniform resource locator (URL);
transmitting, by the electronic transaction attribution server and using the globally unique identifier in the customized hyperlink, the electronic content distribution message to a user account associated with the captured cardholder identifier;
capturing, by the electronic transaction attribution server, interaction data based on monitoring a web page associated with the customized hyperlink for an event indicative of a selection of the customized hyperlink by the cardholder;
associating, by the electronic transaction attribution server, the captured interaction data with the globally unique identifier; and
in response to receiving, by the electronic transaction attribution server and at a second time, a payment card number associated with an electronic transaction from a second point of sale device,
determining, by the electronic transaction attribution server, that the payment card number matches one of the captured payment card number or the additional payment card number associated with the globally unique identifier;
determining, by the electronic transaction attribution server, that the globally unique identifier is associated with the captured interaction data;
requesting and receiving, by the electronic transaction attribution server, a second product identifier associated with a purchased product of the electronic transaction from the second point of sale device; and
attributing, by the electronic transaction attribution server, the electronic transaction to the electronic content distribution campaign based on determining that the second product identifier matches the first product identifier.

2. The method of claim 1, wherein the electronic content distribution message comprises an electronic mail message and the captured cardholder identifier comprises an electronic mail address.

3. The method of claim 1, wherein the interaction data is indicative of an interaction with the customized hyperlink for the product associated with the first product identifier.

4. The method of claim 1, further comprising:
determining, by the electronic transaction attribution server, a bank identification number based at least in part on the captured payment card number; and
determining, by the electronic transaction attribution server, a payment card issuer based at least in part on the determined bank identification number.

5. The method of claim 1, further comprising receiving, by the electronic transaction attribution server, the captured payment card number and the captured cardholder identifier.

6. One or more machine-readable storage media comprising a plurality of instructions stored thereon that in response to being executed by an electronic transaction attribution server, cause the electronic transaction attribution server to:
generate a globally unique identifier, wherein the globally unique identifier links a captured payment card number to a captured cardholder identifier and an additional payment card number, wherein the captured payment card number is captured at a first point of sale device at a first time, and wherein the additional payment card number is requested and received from a payment card issuer associated with the captured payment card number;
generate an electronic content distribution message associated with an electronic content distribution campaign for a product, wherein the product is associated with a first product identifier, and wherein the electronic content distribution message is targeted for a cardholder associated with the captured cardholder identifier and comprises a customized hyperlink including the globally unique identifier appended to a uniform resource locator (URL);
transmit, using the globally unique identifier in the customized hyperlink, the electronic content distribution message to a user account associated with the captured cardholder identifier;
capture interaction data based on monitoring a web page associated with the customized hyperlink for an event indicative of a selection of the customized hyperlink by the cardholder;
associate the captured interaction data with the globally unique identifier; and
in response to receiving, at a second time, a payment card number associated with an electronic transaction from a second point of sale device,
determine that the payment card number matches one of the captured payment card number or the additional payment card number associated with the globally unique identifier;
determine that the globally unique identifier is associated with the captured interaction data;

request and receive a second product identifier associated with a purchased product of the electronic transaction from the second point of sale device; and attribute the electronic transaction to the electronic content distribution campaign based on determining that the second product identifier matches the first product identifier.

7. The one or more machine-readable storage media of claim 6, wherein the electronic content distribution message comprises an electronic mail message, the captured cardholder identifier comprises an electronic mail address, and the interaction data is indicative of an interaction with the customized hyperlink for the product associated with the first product identifier.

8. The one or more machine-readable storage media of claim 6, wherein the plurality of instructions further cause the electronic transaction attribution server to:

determine a bank identification number based at least in part on the captured payment card number; and determine a payment card issuer based at least in part on the determined bank identification number.

9. An electronic transaction attribution system, comprising:

an electronic transaction attribution server comprising a processor executing instructions stored in memory, wherein the instructions cause the processor to:

generate a globally unique identifier, wherein the globally unique identifier links a captured payment card number to a captured cardholder identifier and an additional payment card number, wherein the captured payment card number is captured at a first point of sale device at a first time, and wherein the additional payment card number is requested and received from a payment card issuer associated with the captured payment card number;

generate an electronic content distribution message associated with an electronic content distribution campaign for a product, wherein the product is associated with a first product identifier, and wherein the electronic content distribution message is targeted for a cardholder associated with the captured cardholder identifier and comprises a customized hyperlink including the globally unique identifier appended to a uniform resource locator (URL);

transmit, using the globally unique identifier in the customized hyperlink, the electronic content distribution message to a user account associated with the captured cardholder identifier;

capture interaction data based on monitoring a web page associated with the customized hyperlink for an event indicative of a selection of the customized hyperlink by the cardholder;

associate the captured interaction data with the globally unique identifier; and in response to receiving, at a second time, a payment card number associated with an electronic transaction from a second point of sale device, determine that the payment card number matches one of the captured payment card number or the additional payment card number associated with the globally unique identifier;

determine that the globally unique identifier is associated with the captured interaction data;

request and receive a second product identifier associated with a purchased product of the electronic transaction from the second point of sale device; and attribute the electronic transaction to the electronic content distribution campaign based on determining that the second product identifier matches the first product identifier.

10. The electronic transaction attribution system of claim 9, wherein the interaction data is indicative of an interaction with the customized hyperlink for the product associated with the first product identifier.

11. The electronic transaction attribution system of claim 9, wherein the instructions of the electronic transaction attribution server further cause the processor to:

determine a bank identification number based at least in part on the captured payment card number; and determine a payment card issuer based at least in part on the determined bank identification number.

* * * * *